Figure 1:
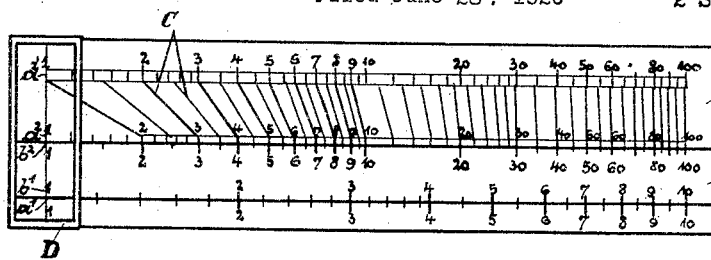
Figure 2:
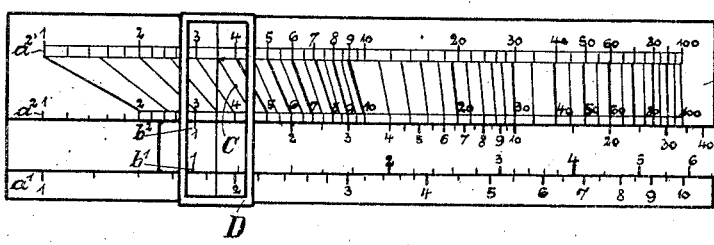

Dec. 4, 1923.

P. JARAY 1,475,999

SLIDE RULE WITH LOGARITHMICAL GRAUDATIONS

Filed June 28, 1920 2 Sheets-Sheet 1

INVENTOR:

Paul Jaray

Dec. 4, 1923.
P. JARAY
1,475,999
SLIDE RULE WITH LOGARITHMICAL GRADUATIONS
Filed June 28, 1920  2 Sheets-Sheet 2
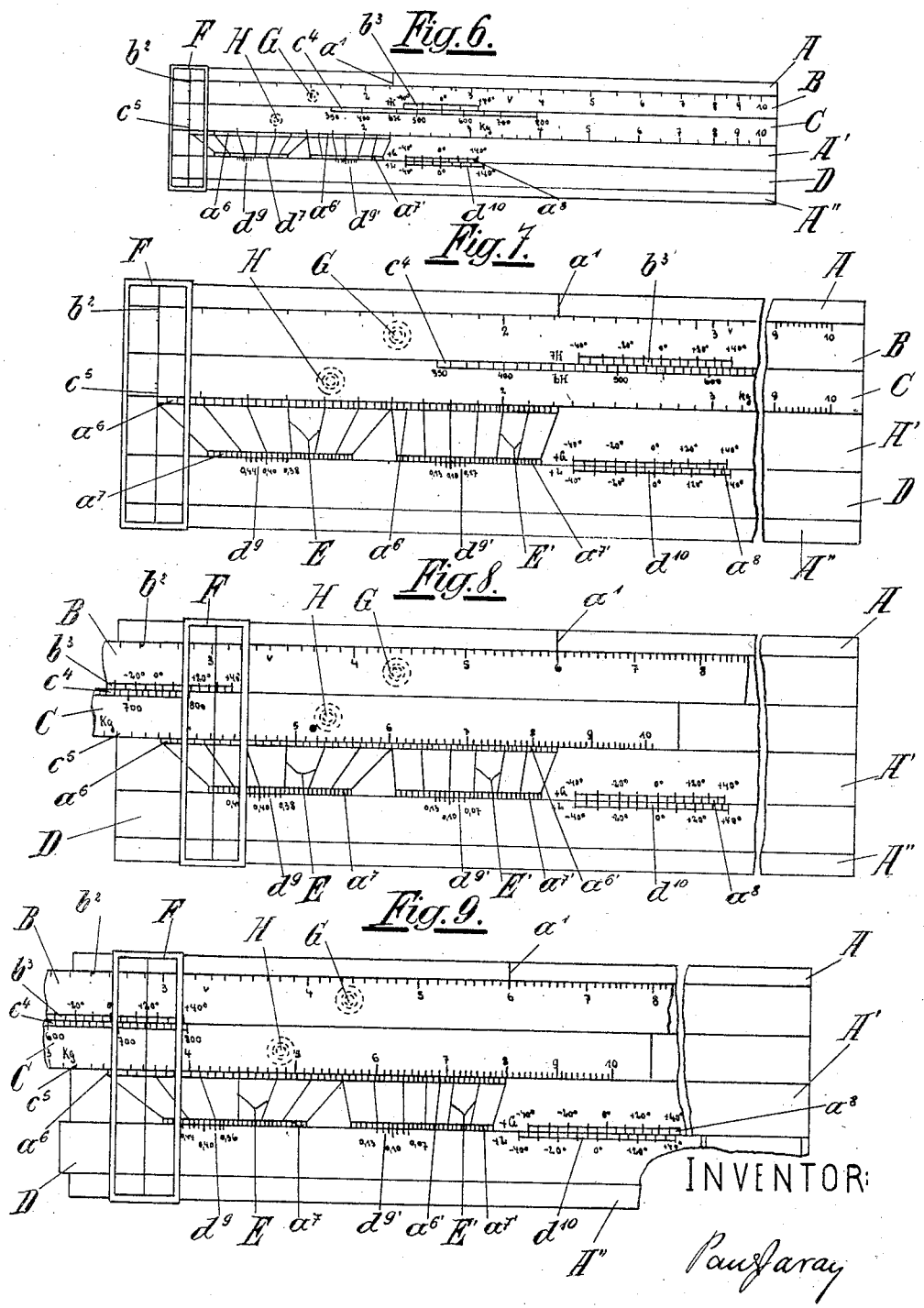

Patented Dec. 4, 1923.

1,475,999

UNITED STATES PATENT OFFICE.

PAUL JARAY, OF FRIEDRICHSHAFEN, GERMANY, ASSIGNOR TO THE FIRM LUFT-SCHIFFBAU ZEPPLIN GESELLSCHAFT MIT BESCHRÄNKTER HAFTUNG, OF FRIED-RICHSHAFEN, GERMANY.

SLIDE RULE WITH LOGARITHMICAL GRADUATIONS.

Application filed June 28, 1920. Serial No. 392,570.

*To all whom it may concern:*

Be it known that I, PAUL JARAY, a citizen of the Austrian Republic, residing at Friedrichshafen, Germany, have invented certain new and useful Improvements in Slide Rules with Logarithmical Graduations, of which the following is a specification.

My invention refers to slide rules with logarithmical graduations and concerns substantially the arrangement and development of the scales. By means of rules of this kind given figures can be directly multiplied together and divided, i. e. expressions like $$a \times b, \frac{a}{b}, \frac{a \times b}{c}, \frac{a}{b \times c},$$

etc., can be verified at once. But when the definite figure is replaced by an algebraic sum of the form $(u \times v \pm w)$ or $$\frac{u}{v} \pm w,$$

the continuous use of a slide rule is impossible. The invention tends to avoid this defect and thereby to increase considerably the applicability of the logarithmical slide rule.

Thus the object of the present invention is a slide rule with logarithmical graduations, on which at least two of the logarithmical scales immovable relatively to the slide rule body are arranged relatively to each other by an assemblage of connecting lines in such a manner that corresponding points of both scales invariably show the same numerical difference. If such a slide rule is designed for general calculation rather than for the solution of certain special problems, in which the figures $u$, $v$ and $w$ of the algebraic sum are variable to a certain extent only, it can be improved further by a certain modification of the individual scales. By doing this according to its special development new fields of application are opened, in which a quick verification of the results of numerous values observed is very valuable or rather necessary, but could not be effected without any special intermediate calculation or a sometimes confusing use of auxiliary tables.

An important special problem of this kind, whose quick and complete solution by means of a slide rule could not be effected heretofore, was the calculation of the lifting power of air-balloons. The total lifting power of an air-balloon or of an airship is known not to be a definite value, but it depends, apart from the properties of the gas, upon many outer influences often changing quickly during a voyage, such as pressure and temperature, and upon the inflation of the balloon.

V may signify the volume of the balloon fully inflated.

$b_H$ the hei*gh*t of the barometer.

$T_H = (273 + t_H)$ the temperature of the gas at the greatest height the balloon had reached up to the moment of the verification of the lifting power.

$T_g = (273 + t_g)$ the temperature of the gas at the moment of the verification of the lifting power.

$T_L = (273 + t_L)$ the temperature of the air.

$d$ the proportion of the gas density to air density at equal power and temperature.

$\triangleleft$ a figure of correction which depends upon the degree of humidity of the air and differs from zero, if at all, only at higher temperatures.

K a constant and

A the required resulting lifting power of the balloon; then this equation will express the conditions:

1. $A = K \times V \times \dfrac{b_H}{T_L} \times \left[ \dfrac{T_G}{T_L(1+\triangleleft)} - d \right] = K \times V \times \left( \dfrac{b_H}{273+t_L} \right) \times \left[ \dfrac{273+t_G}{(273+t_L)(1+\triangleleft)} - d \right]$ wherein ⊲ may be neglected with close and for most practical measurements amply sufficient approximation and wherein $d$ can be taken for a constant. Under this assumption the whole lifting power is:

$$2. \quad A = K \times V \times \frac{b_H}{T_H} \times \left[\frac{T_G}{T_L} - \text{const.}\right] = K \times V \times \left(\frac{b_H}{273 + t_H}\right) \times \left[\frac{273 + t_G}{273 + t_L} - \text{const.}\right]$$

The desired value A thus depends upon seven other values, five of which, namely the expressions V, $b_H$, $T_H$, $T_G$, $T_L$, are variable. The variability does not extend over the whole range of figures, but is limited by certain upper and lower limits according to their scientific signification. To utilize this limitation of the individual figure ranges to attain a special clearness and easy handling of the slide rule is a further aim of the invention.

According to the present invention this aim is attained by a slide rule fitted with some moving slides, in which the scales connected by the time connecting line are preferably longitudinally staggered relatively to each other, but in which each scale shows only one kind of concrete numbers and comprises only the range of figures valid for these numbers according to their physical meaning. As a further extension of the invention preferably for the moving scales of those numbers, which according to their scientific signification possess parametric quality, i. e. represent for some time a value substantially invariable, special arresting appliances are provided.

In the drawings affixed to this specification and forming part thereof several modifications of the object of the present invention are illustrated by way of example in various positions of the slide.

In the drawings

Figs. 1 to 5 show a slide rule designed mainly for general calculations fitted with one moving slide, and Figs. 6 to 9 a slide rule fitted with several slides and designed especially for the calculation of the lifting power of airships.

The slide rule according to the first modification consists of a body A and a moving slide B. The slide possesses a bottom scale $b^1$ and a top scale $b^2$ of the ordinary logarithmical graduation.

The body has corresponding scales $a^1$ and $a^2$ which—as on the ordinary slide rules—correspond exactly to the coordinate figures of the slides and comprise as usually one or two decades. Moreover the body of the rule A contains in its upper part a scale $a^{2\prime}$ which is absolutely uniform with scale $a^2$ as to graduation and arrangement. Both scales $a^2$ and $a^{2\prime}$ are coordinated by an assemblage of connecting lines in such a manner that each point of the lower line $a^2$ corresponds to the same point minus one unit of the upper scale $a^{2\prime}$.

By means of the slide rule all known operations such as multiplying, dividing etc. can be executed. Moreover expressions of the form $$(u \times v \pm w) \text{ and } \left(\frac{u}{v} \pm w\right)$$

may be determined at once and multiplied and divided by other figures. In the simplest case $u$, $v$ and $w$ represent known quantities, but they may be as well products or quotients of such. In order to utilize the object of the invention for the verification of the algebraic expressions given above they should be imagined as being written in this form:

$$\left(\frac{u}{w} \times v \pm 1\right)w \text{ and } \left(\frac{u}{v} \times w \pm 1\right)w.$$

Two simple numeric examples may serve as illustrations.

1. The value $$6 \times 1.5 - 2 = \left(\frac{6}{2} \times 1.5 - 1\right)2$$

is to be determined.

The slide B (Fig. 2) is shifted to the right until 2 in scale $b^2$ is below 6 in scale $a^2$. The figure 1.5 of scale $b^2$ then coincides with figure 4.5 of scale $a^2$. The corresponding connection line $c$ leads to figure 3.5 in scale $a^{2\prime}$, which can be marked by a window slide D. Upon now moving slide until its front edge coincides with the vertical line of the window slide, the figure 2 of scale $b^2$ on the slide coincides with the desired result 7 in scale $a^2$.

2. The following sum is to be determined:

$$\left(\frac{7.5}{3} + \frac{1}{2}\right) = \left(\frac{7.5}{3} \times 2 + 1\right) \times \frac{1}{2} = (5+1) \times \frac{1}{2} = 3.$$

Figure 3:
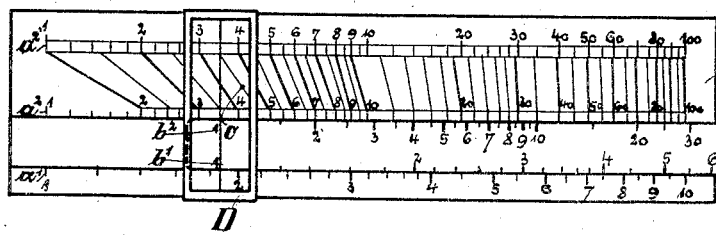
Figure 4:
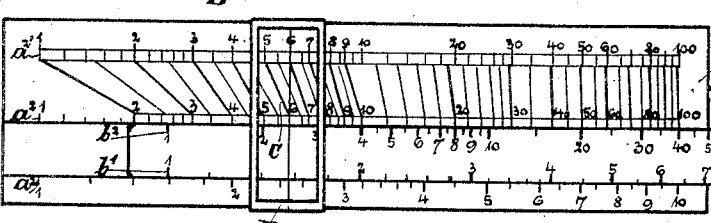
Figure 5:
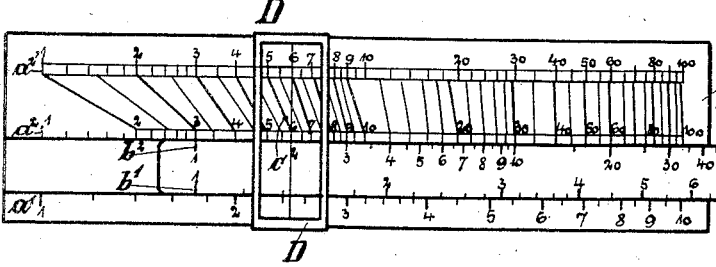

Figure 3 in the slide scale $b^2$ (Fig. 4) is made to coincide with figure 7.5 in scale $a^2$. Then figure 5 of both scales $a^2$ and $a^{2\prime}$ corresponds to figure 2 in scale $b^2$. The connecting line $c$ belonging to $a^{2\prime}$ leads to figure 6 in scale $a^2$, which may be marked by the window slide. If then slide B (Fig. 5) is shifted until its figure 2 appears in the window, i. e. coincides with figure 6 of scale $a^2$, the beginning of the slide scale indicates the desired result 3 in scale $a^2$. As both examples show, by twice or three times shifting the slide an algebraic sum of the type mentioned can be worked out.

Even in this arrangement the slide rule can be used for lifting power calculation according to equation 2, but a certain disadvantage resides in the fact that for working out an equation comprising so many figures six or seven movements of the slide rule and the corresponding intermediate readings are required.

Hereby the accuracy and swiftness of working out the result become insufficient. This deficiency is avoided by a special slide rule for lifting power calculation, as shown by the second modification, of which Fig. 6 gives a general view and Figs. 7 to 9 partial views on a larger scale.

The slide rule has three stationary guide bars A, A' and A'' and three moving slides B, C and D. The slides B and C glide in direct touch with one another between the upper and the middle guide bar. The slide D glides between the middle and the lower guide bar. The upper guide bar A has a mark $a^1$. The upper slide B has an upper scale $b^2$ giving the gas bag volume in cubic metres and a lower scale $b^3$ showing the temperature $t_H$ from $-40°$ to $+40°$. The middle slide contains an upper scale $c^4$ and a lower one $c^5$. The former indicates the barometric pressure $b_H$, in millimeters of mercury, extending from 350 mm. (corresponding to an absolute height of ca. 6000 m.) to 800 mm. (very high barometric pressure at sea level). On the lower scale $c^5$ the resulting lifting power A is given in kilograms. The middle guiding bar A' has on the left two upper scales $a^6$ and $a^{6\prime}$, to which are coordinated two lower scales $a^7$ and $a^{7\prime}$ by means of two assemblages of connecting lines E and E'. Moreover on the middle guide bar a scale $a^8$ is provided for the temperature $t_G$ extending from $-40°$ to $+40°$. The bottom slide D has on the left two scales $d^9$ and $d^{9\prime}$ for the proportion of gas density to air density. Further to the right is a scale $d^{10}$ for the temperature $t_L$ extending from $-40°$ to $+40°$, whose figures for the sake of greater accuracy are corrected by the correcting factor $(1-\triangleleft)$ allowing for the humidity of the air. Besides a window slide F is provided. By set-screws G and H inserted in the back of the slide rule body the slides B and C can be locked.

The scales $b^2$, $b^3$, $c^4$, $c^5$, $a^6$ and $a^{6\prime}$ show an identical logarithmic graduation. Equally the scales $a^7$, $a^{7\prime}$, $a^8$, $d^9$, $d^{9\prime}$ and $d^{10}$ are fitted with a logarithmic graduation of the same unit. In order to facilitate the handling of the device of the slide rule several scales e. g. $a^7$, $a^{7\prime}$ and $a^8$ as well as $d^9$, $d^{9\prime}$ and $d^{10}$ are spaced relatively to each other by certain distances equal for the corresponding pairs. The diagonal or connecting lines E and E' connect coordinate quantities whose figure values differ by the average proportion of gas density to air density. With illuminating gas this proportion varies from 0.36 to 0.44 and is at an average 0.40; with hydrogen the value varies from 0.07 to 0.13; the average is 0.10. Accordingly each point of the illuminating gas scale $a^7$ is increased by 0.4 units as compared to the coordinate point of scale $a^6$; equally each point of scale $a^{6\prime}$ is smaller by 0.10 units than the coordinate point of the hydrogen scale $a^{7\prime}$ in a similar manner, as hereinbefore described with reference to the two scales $a^2$ and $a^{2\prime}$. In both cases the division point of one of the coordinate scales is connected by a diagonal line or the like to the division point of the opposite scale which corresponds to the division point first referred to including a positive or negative increment.

The handling of the slide rule will be illustrated by some examples in figures. The general constant has in round figures the value $K=0.45$. To determine the resulting lifting power A of a free balloon of $V=600$ cbm capacity, which at sea level ($b_H=760$ mm. of Hg.) and at a temperature $t_G=t_L=t_H=0°$ is fully inflated and which is filled with heavy illuminating gas of a density $d=0.44$.

Slide B (Figs. 7 and 8) is shifted until figure 6 in scale $b^2$ coincides with the mark figure $a^1$ and is locked in this position by set-screw G. Then slide C is shifted so that the figure $b_H=760$ in scale $c^4$ coincides with $t_H=0°$ in scale $b^3$. Slide D is left in its normal position (Figs. 6 and 7), as in this the values $t_G=0°$ and $t_L=0°$ in the scales $a^8$ and $d^{10}$ coincide normally. Then division $d=0.44$ in scale $d^9$ on top coincides with a division of scale $a^7$. If now the window slide is set upon the corresponding division of scale $a^6$, the figure 4.21 is read in scale $c^5$ of slide C. The desired result, i. e. the lifting power is thus $A=421$ kg.

Assume that when the balloon without throwing off ballast has reached a height of about 900 metres (corresponding to a barometric pressure $b_H=680$ mm.) at a gas temperature $t_H=5°$ C, it reaches warmer currents of air and starts sinking, whereby the gas is again somewhat warmed. Shortly before the landing the temperature of the air may be assumed to be $t_L=+10°$ and the gas has been warmed to $t_G=+5°$ C. How much ballast must be thrown off during the sinking to just keep the balloon in equilibrium?

Slide C (Fig. 9) is shifted so that the figure $b_H=680$ in scale $c^4$ comes below figure $t_H=-5°$ of the set scale $b^3$ (and set-screw H is preferably tightened). Now slide D is shifted so that $t_L=+10°$ in scale $d^{10}$ coincides with figure $t_G=+5°$ in scale $a^8$. The division $d=0.44$ in scale $d^9$ thus coincides exactly with a division of scale $a^7$. If the window slide is shifted upon the coordinate division of scale $a^6$, it covers the figure 3.70 in scale $c^5$ of slide C. This means that the existing lifting power is still $A=370$ kg, i. e. it has been reduced compared to the start of the voyage by $421-370=51$ kg.

The ballast thrown off must at least equal this weight. If more ballast is thrown off, so that the balloon rises again, the slides B and C may be left clamped for the further voyage provided that the original highest altitude of 900 mm. ($b_H=680$ mm.) be not exceeded. Thus the lifting power can be ascertained at any moment in a most simple manner by bringing to coincidence the measured temperatures of air and gas $t_L$ and $t_G$ by means of the bottom slide and covering by the window slide the upper end of connecting line E corresponding to scale division $d=0.44$. In scale $c^5$ the resulting lifting power can thus always be read off. As each scale has one meaning and comprises the necessary ranges of figures only, error and waste of time in handling are minimized. As all scales are free for inspection at the same time, all proportions can be ascertained at a glance, no matter which of the numerous figures is wanted.

In exactly the same way the slide rule can be used if hydrogen is used for lifting. But in this case the scales $a^6$, $a^7$ and $d^9$ are replaced by the scales $a^{6'}$, $a^{7'}$ and $d^{9'}$. As may be seen from Figs. 8 and 9 with a filling of hydrogen gas of $D=0.10$ density the lifting power under otherwise equal conditions would be at the start 677 and near the end 604 kg.

Though the slide rule according to the second modification is especially adapted for the calculation of lifting power, it may be utilized for other purposes. For many calculations, techinal and commercial, in which sums occur as parts of products or quotients, the slide rule could even be more simplified.

I claim:

1. In a slide rule the combination with a relatively stationary graduated ruler, and two adjacent parallel sliding rulers, longitudinally displaceably mounted on such stationary ruler, of oppositely and alternately arranged equally numerically subdivided scale sections indicating respectively proportions of gas density and air density, and connecting lines between the corresponding oppositely situated values of these density proportions, pressure indicating logarithmic scales on one of said sliding rulers and volume indicating logarithmic scales on the other sliding ruler.

2. In a slide rule the combination with a relatively stationary graduated ruler and two adjacent parallel sliding rulers longitudinally displaceable on such stationary ruler, of oppositely and alternatingly arranged, equally numerically subdivided scale sections on such stationary ruler, indicating respectively proportions of gas density and air density, and connecting lines between the corresponding oppositely situated values for these density proportions, pressure indicating logarithmic graduations, and lifting power indicating graduations on one of said sliding rulers, and volume and temperature indicating graduations on the other sliding ruler, an additional sliding ruler on said stationary ruler and parallelly spaced from the first-mentioned sliding rulers, and containing a temperature scale and registerable with the scale sections of the stationary ruler, and a rider index movable along the stationary and movable slides.

3. In a device of the kind described in combination, a rule, a plurality of slides movable relatively to said rule and of logarithmically graduated scales, on slide carrying scales for temperature and volume of the gas, respectively, another scales for the height of the barometer and for the lifting power of gas respectively, a third scales for the temperature of the air and for the specific weight of the gas, respectively, and a mark, a scale for the temperature of the gas and a plurality of lines on said rule, said lines connecting the scales for the specific weight and for the lifting power of the gas in such wise that corresponding points of said scales present like numerical differences.

In testimony whereof I affix my signature.

PAUL JARAY.